(12) United States Patent
Okazaki et al.

(10) Patent No.: US 11,604,477 B2
(45) Date of Patent: Mar. 14, 2023

(54) OPERATION MANAGEMENT APPARATUS, OPERATION MANAGEMENT METHOD, AND TRAFFIC SYSTEM

(71) Applicants: TOYOTA JIDOSHA KABUSHIKI KAISHA, Toyota (JP); DENSO CORPORATION, Kariya (JP)

(72) Inventors: Kenji Okazaki, Toyota (JP); Hiroshi Higashide, Toyota (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 105 days.

(21) Appl. No.: 17/213,308

(22) Filed: Mar. 26, 2021

(65) Prior Publication Data
US 2021/0311497 A1    Oct. 7, 2021

(30) Foreign Application Priority Data
Apr. 2, 2020  (JP) .............................. JP2020-066598

(51) Int. Cl.
*G05D 1/00*  (2006.01)
*G05D 1/02*  (2020.01)

(52) U.S. Cl.
CPC ......... *G05D 1/0293* (2013.01); *G05D 1/0088* (2013.01); *G05D 1/0212* (2013.01); *G05D 1/0289* (2013.01)

(58) Field of Classification Search
CPC ............... G05D 1/0293; G05D 1/0088; G05D 1/0212; G05D 1/0289
See application file for complete search history.

(56) References Cited

U.S. PATENT DOCUMENTS

| | | | | |
|---|---|---|---|---|
| 2015/0154871 A1* | 6/2015 | Rothoff | ............... | G08G 1/22 701/2 |
| 2015/0360705 A1* | 12/2015 | Niinomi | ............... | B60L 15/40 701/118 |
| 2015/0360706 A1* | 12/2015 | Niinomi | ............... | B61L 27/12 701/19 |

FOREIGN PATENT DOCUMENTS

| | | |
|---|---|---|
| CN | 101571996 A | 11/2009 |
| CN | 105469624 A | 4/2016 |
| JP | 2000-264210 A | 9/2000 |
| JP | 2005-222144 A | 8/2005 |

* cited by examiner

*Primary Examiner* — Vivek D Koppikar
*Assistant Examiner* — Farhad Dawodi
(74) *Attorney, Agent, or Firm* — Oliff PLC

(57) ABSTRACT

An operation management apparatus includes a plan generator configured to generate a travel plan for each of a plurality of vehicles that form a line of vehicles and that travel autonomously along a predetermined travel route; a communication device configured to transmit the travel plans to the respective vehicles and receive, from the vehicles, travel information that indicates travel status of the vehicles; and an operation monitor configured to detect, based on the travel information, whether or not overtaking and passing of the vehicles have occurred. In response to the overtaking and passing, the plan generator modifies the travel plans so as to keep the order as switched upon the overtaking and passing.

4 Claims, 10 Drawing Sheets

|   | a | b | c | d | a | b | c |
|---|---|---|---|---|---|---|---|
| A | 7:00 ⑤ | 7:05 | 7:10 | 7:15 | 7:20 | 7:25 | 7:30 |
| B | 6:55 | 7:00 | 7:05 | 7:10 | 7:15 | 7:20 | 7:25 |
| C | 6:50 | 6:55 | 7:00 | 7:05 | 7:10 | 7:15 | 7:20 |
| D | 6:45 | 6:50 | 6:55 | 7:00 | 7:05 | 7:10 | 7:15 |

FIG. 4

OPERATION MANAGEMENT APPARATUS, OPERATION MANAGEMENT METHOD, AND TRAFFIC SYSTEM

CROSS REFERENCE TO RELATED APPLICATION

This application claims priority to Japanese Patent Application No. 2020-066598 filed on Apr. 2, 2020, which is incorporated herein by reference in its entirety including the specification, claims, drawings, and abstract.

TECHNICAL FIELD

The present specification discloses an operation management apparatus and an operation management method for managing operations of a plurality of vehicles that travel autonomously along a predetermined travel route, and a traffic system that includes the operation management apparatus.

BACKGROUND

In recent years, there have been proposed traffic systems in which autonomous vehicles are used. For example, JP 2000-264210 A discloses a vehicle traffic system in which vehicles that can travel autonomously along dedicated tracks are used. This vehicle traffic system includes a plurality of vehicles that travel along dedicated tracks, and a centralized control system that operates the plurality of vehicles. The centralized control system transmits to the vehicles a departure command or a course command according to an operation plan.

In this vehicle traffic system, one or more of the vehicles are sometimes delayed from the operation plan for various reasons. Such delay may cause a delayed vehicle to be overtaken and passed by another vehicle, thereby switching the order of vehicles in a line of vehicles. Then, in order to satisfy the operation plan, the order of vehicles should be returned to the original order by causing the delayed vehicle that has been passed to overtake and pass the vehicle that has passed it. However, such frequent overtaking and passing tend to impede stable traveling of vehicles. To address this situation, when the order of vehicles is switched, the operation plan should be changed rather than keeping the original operation plan.

However, JP 2000-264210 A, which is based on the precondition that vehicles travel according to the operation plan, nowhere considers what should be done when the actual order of vehicles is switched. Therefore, the structure disclosed in JP 2000-264210 A may suffer from impediments to stable traveling of vehicles, as frequent overtaking and passing occur in response to switching of the actual order of vehicles.

To address this situation, the present specification discloses an operation management apparatus, an operation management method, and a traffic system that enable more stable travel of vehicles.

SUMMARY

The present specification discloses an operation management apparatus comprising a plan generator configured to generate a travel plan for each of a plurality of vehicles that form a line of vehicles and that travel autonomously along a predetermined travel route; a communication device configured to transmit the travel plans to the respective vehicles and receive, from the vehicles, travel information that indicates travel status of the vehicles; and an operation monitor configured to detect, based on the travel information, whether or not overtaking and passing of the vehicles have occurred, wherein, in response to the overtaking and passing, the plan generator modifies the travel plans so as to keep the order as switched upon the overtaking and passing.

With this structure, as frequent overtaking and passing are avoided, vehicles can travel more stably.

In this structure, in response to the overtaking and passing, the plan generator may modify the travel plans so that the yet-to-be-modified travel plan of a vehicle that has overtaken and passed another vehicle is switched with the yet-to-be-modified travel plan of the vehicle that has been overtaken and passed.

With this structure, as travel plans for two vehicles are simply switched, the travel plans can be modified through a simple process.

When a single vehicle has been overtaken and passed more than an acceptable number of times within a predetermined monitoring period, the plan generator may modify the travel plans so as to remove that single vehicle from the line of vehicles and add a new vehicle to the line of vehicles.

With this structure, a vehicle that has some trouble can be replaced with another vehicle, and the stability of a traffic system can be further improved.

The present specification discloses an operation management method comprising generating a travel plan for each of a plurality of vehicles that form a line of vehicles and that travel autonomously along a predetermined travel route; transmitting the travel plans to the respective vehicles; receiving, from the vehicles, travel information that indicates travel status of the vehicles; and detecting, based on the travel information, whether or not overtaking and passing of the vehicles have occurred, wherein, in response to the overtaking and passing, the travel plans are modified so as to keep the order as switched upon the overtaking and passing.

The present specification discloses a traffic system comprising a line of vehicles that includes a plurality of vehicles that travel autonomously along a predetermined travel route; and an operation management apparatus configured to manage operations of the plurality of vehicles, wherein the operation management apparatus comprises a plan generator configured to generate a travel plan for each of the plurality of vehicles; a communication device configured to transmit the travel plans to the respective vehicles and receive, from the vehicles, travel information that indicates travel status of the vehicles; and an operation monitor configured to detect, based on the travel information, whether or not overtaking and passing of the vehicles have occurred, wherein, in response to the overtaking and passing, the plan generator modifies the travel plans so as to keep the order as switched upon the overtaking and passing.

The techniques disclosed in the present specification enable vehicles to travel more stably.

BRIEF DESCRIPTION OF DRAWINGS

Embodiments of the present disclosure will be described based on the following figures, wherein:

FIG. 4 provides an example of travel plans that are used in the traffic system of FIG. 1;

DESCRIPTION OF EMBODIMENTS

Figure 1:
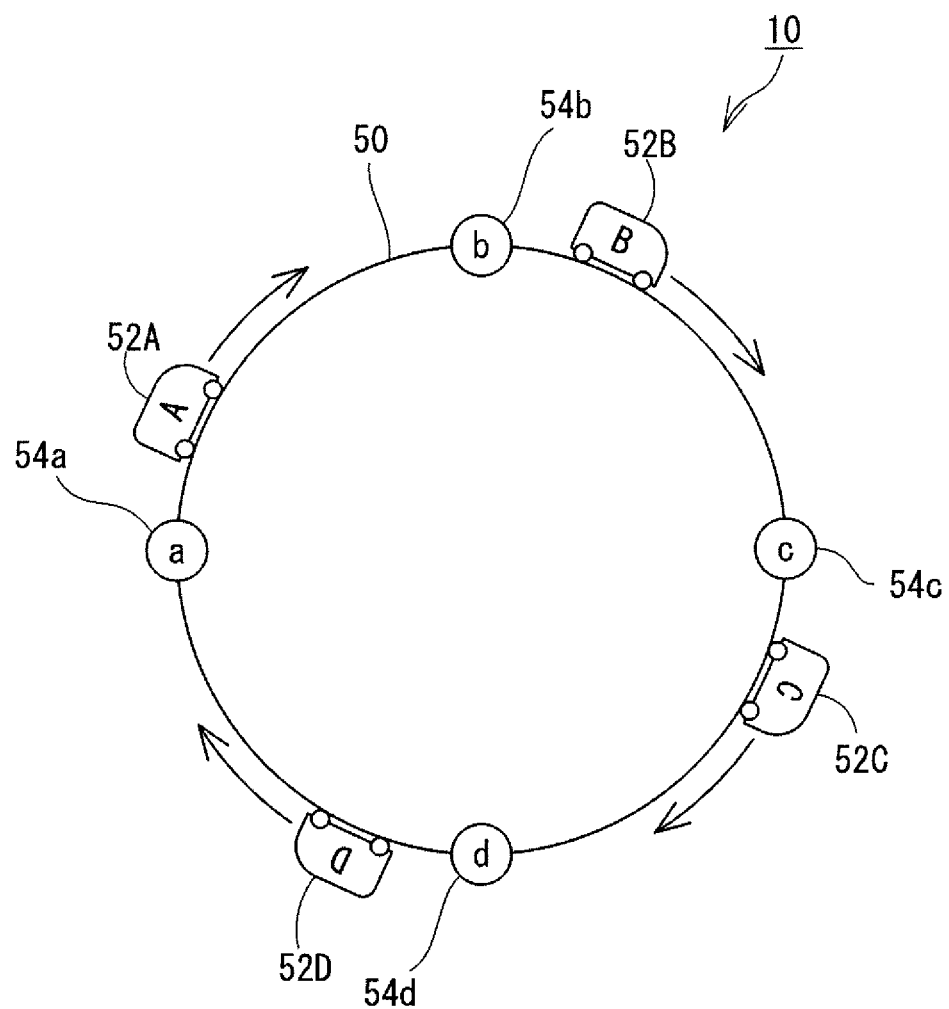
FIG. 1 is a conceptual diagram of a traffic system.
Figure 2:
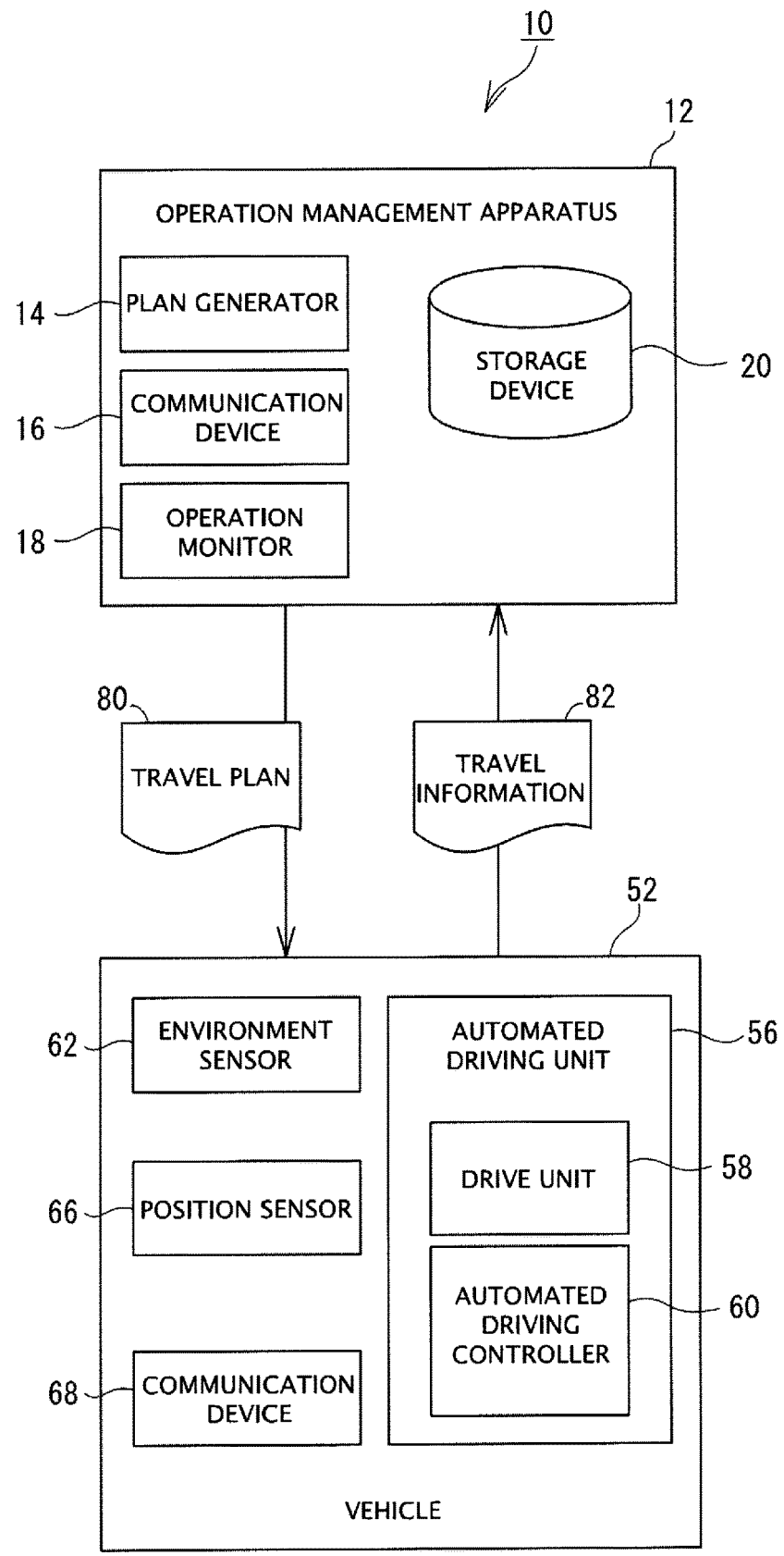
FIG. 2 is a block diagram of the traffic system.
Figure 3:
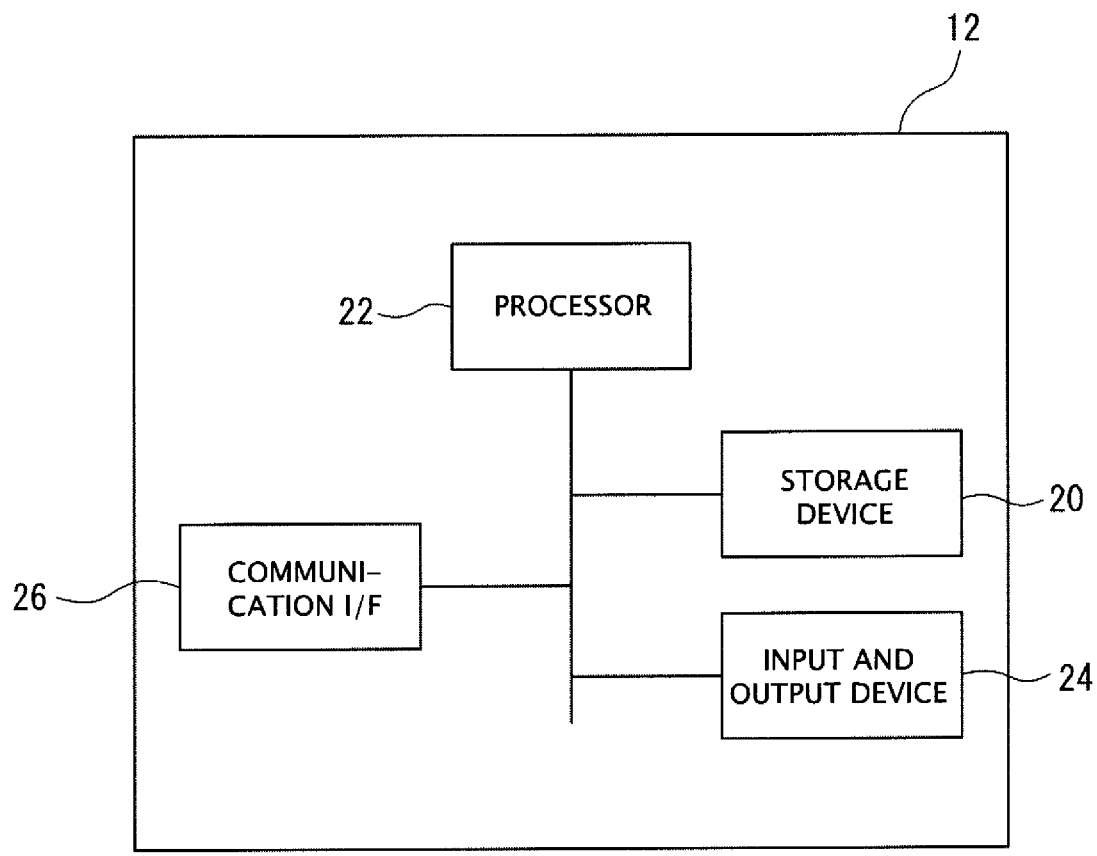
FIG. 3 is a block diagram illustrating a physical structure of an operation management apparatus.

A structure of a traffic system 10 will be described below with reference to the accompanying drawings. FIG. 1 is a conceptual diagram of the traffic system 10, and FIG. 2 is a block diagram of the traffic system 10. FIG. 3 is a block diagram illustrating a physical structure of an operation management apparatus 12.

The traffic system 10 transports a large number of unspecified passengers along a predetermined travel route 50. The traffic system 10 includes a plurality of vehicles 52A to 52D that can travel autonomously along the travel route 50. A plurality of stations 54a to 54d are set on the travel route 50. In the following description, the plurality of vehicles 52A to 52D are expressed as "vehicle 52" with no alphabetical suffix when there is no need to distinguish them from one another. Similarly, the plurality of stations 54a to 54d are also expressed as "station 54" when there is no need to distinguish them from one another.

The travel route 50 may be provided in a particular private site or may be a public road. In any case, at least either the travel route 50 or the stations 54 have space that allows one vehicle 52 to overtake and pass another vehicle 52 ahead. The plurality of vehicles 52 travel in a loop along the travel route 50 in one direction and form a line of vehicles. A vehicle 52 temporarily stops at each station 54. During the time when the vehicle 52 temporarily stops, passengers board the vehicle 52 or get out of the vehicle 52. As such, in the illustrated embodiment, each vehicle 52 serves as a passenger bus for transporting a large number of unspecified passengers from one station 54 to another station 54. The operation management apparatus 12 (not illustrated in FIG. 1; see FIGS. 2 and 3) manages operations of a plurality of such vehicles 52. In the illustrated embodiment, the operation management apparatus 12 controls operations of the plurality of vehicles 52 so that they operate at even intervals. The even-interval operation is a form of operation in which the vehicles 52 depart from each station 54 at equal intervals. As such, the even-interval operation is a form of operation in which, for example, the vehicles 52 depart from the station 54a at intervals of 5 minutes and also depart from each of the remaining stations 54b, 54c, and 54d at intervals of 5 minutes.

The above-described elements of the traffic system 10 will be more specifically described below. The vehicles 52 travel autonomously according to travel plans 80 that are supplied from the operation management apparatus 12. The travel plans 80 set travel schedules for the vehicles 52. In the illustrated embodiment, the travel plans 80 set departure times at which the vehicles 52 depart from the stations 54a to 54d, which will be described later in detail. The vehicles 52 travel autonomously so as to be able to depart at the departure times that are set by the travel plans 80. In other words, for example, a vehicle 52 itself determines the travel speed at which the vehicle 52 travels between stations, whether or not it should stop at, for example, a traffic signal, and whether or not it should overtake and pass another vehicle.

As illustrated in FIG. 2, the vehicle 52 includes an automated driving unit 56. The automated driving unit 56 is roughly composed of a drive unit 58 and an automated driving controller 60. The drive unit 58 is a basic unit for causing the vehicle 52 to travel and includes, for example, a motor, a power transmission device, a brake device, a traveling device, a suspension device, and a steering device. The automated driving controller 60 controls driving of the drive unit 58 and causes the vehicle 52 to travel autonomously. The automated driving controller 60 is, for example, a computer that includes a processor and a memory. The term "computer" also encompasses a microcontroller that incorporates a computer system in a single integrated circuit. The term "processor" refers to a processor in a broad sense, including a general-purpose processor, such as a central processing unit (CPU), and a special-purpose processor, such as a graphics processing unit (GPU), an application specific integrated circuit (ASIC), a field programmable gate array (FPGA), or a programmable logic device (PLD).

To enable autonomous traveling, the vehicle 52 further incorporates an environment sensor 62 and a position sensor 66. The environment sensor 62 detects the surrounding environment of the vehicle 52 and includes, for example, a camera, a Lidar, millimeter-wave radar, sonar, and a magnetic sensor. Based on results of detection obtained from the environment sensor 62, the automated driving controller 60 recognizes, for example, the type of an object present around the vehicle 52, the distance from the object, road surface markings on the travel route 50 (such as white lines), and traffic signs. The position sensor 66 detects the current position of the vehicle 52 and is, for example, a GPS receiver. Results of detection obtained from the position sensor 66 are also transmitted to the automated driving controller 60. Based on results of detection obtained from the environment sensor 62 and the position sensor 66, the automated driving controller 60 controls acceleration/deceleration and steering of the vehicle 52. Travel information 82, which indicates the status of such control performed by the automated driving controller 60, is transmitted to the operation management apparatus 12. The travel information 82 includes, for example, the current position of the vehicle 52.

The vehicle 52 further includes a communication device 68. The communication device 68 performs wireless communication with the operation management apparatus 12. The communication device 68 is capable of Internet communication via a wireless LAN, such as WiFi (registered trademark), or mobile data communication for which, for example, mobile phone companies provide service. The communication device 68 receives the travel plan 80 from the operation management apparatus 12 and transmits the travel information 82 to the operation management apparatus 12.

The operation management apparatus 12 monitors the operation status of the vehicle 52 and controls the operation of the vehicle 52 in accordance with the operation status. As illustrated in FIG. 3, the operation management apparatus 12 is in physical form a computer that includes a processor 22, a storage device 20, an input and output device 24, and a communication I/F 26. The term "processor" refers to a processor in a broad sense, including a general-purpose processor (such as a CPU) and a special-purpose processor (such as a GPU, an ASIC, an FPGA, or a PLD). The storage device 20 may include at least one of a semiconductor memory (such as a RAM, a ROM, or a solid-state drive) and a magnetic disk (such as a hard disk drive). Although in FIG. 3 the operation management apparatus 12 is illustrated as a single-unit computer, the operation management apparatus 12 may be composed of a plurality of computers that are physically separate from each other.

As illustrated in FIG. 2, the operation management apparatus 12 functionally includes a plan generator 14, a communication device 16, an operation monitor 18, and the storage device 20. The plan generator 14 generates a travel plan 80 for each of a plurality of vehicles 52. When overtaking and passing of the vehicles 52 have occurred on the travel route 50, the plan generator 14 modifies the travel plans 80 so as to keep the order as switched upon the overtaking and passing, which will be described later.

The communication device 16 performs wireless communication with the vehicles 52 and is capable of Internet communication using, for example, WiFi or mobile data communication. The communication device 16 transmits the travel plans 80 generated or regenerated by the plan generator 14 to the vehicles 52 and receives the travel information 82 from the vehicles 52.

The operation monitor 18 obtains the operation status of the vehicle 52 based on the travel information 82 transmitted from the vehicles 52. As described above, the travel information 82 includes the current position of the vehicle 52. Based on the positions of the vehicles 52, the operation monitor 18 detects, for example, delays of the vehicles 52 from the travel plans 80 or whether or not overtaking and passing of the vehicles have occurred on the travel route 50.

The generation of the travel plans 80 in the above-described operation management apparatus 12 will next be described in detail. FIG. 4 provides an example of the travel plans 80 that are used in the traffic system 10 of FIG. 1. In the example illustrated in FIG. 1, the line of vehicles includes four vehicles 52A to 52D, and four stations 54a to 54d are disposed at even intervals along the travel route 50. In this example, the time it takes for the vehicles 52 to complete a single journey along the travel route 50; that is, a lap time TC, is 20 minutes.

In this case, the operation management apparatus 12 generates the travel plans 80 such that intervals at which the vehicles 52 depart from the stations 54 are equal lengths of time calculated by dividing the lap time TC by the number N of the vehicles 52, 20/4=5 minutes. As listed in FIG. 4, the travel plans 80 record only the departure times for the respective stations 54. For example, the travel plan 80D transmitted to the vehicle 52D records the target times at which the vehicle 52D is scheduled to depart from the respective stations 54a to 54d.

The travel plans 80 typically record only time schedules for a single complete journey and are transmitted from the operation management apparatus 12 to the vehicles 52 at a time when the vehicles 52 have reached a particular station, such as the station 54a. For example, the vehicle 52C receives the travel plan 80C for a single complete journey from the operation management apparatus 12 at the time at which the vehicle 52C has reached the station 54a (for example, 6:49), and the vehicle 52D receives the travel plan 80D for a single complete journey from the operation management apparatus 12 at the time at which the vehicle 52D has reached the station 54a (for example, 6:44). However, when the travel plans 80 are modified due to, for example, a delay of a vehicle 52 or overtaking and passing, new travel plans 80 are transmitted from the operation management apparatus 12 to the vehicles 52 even when the vehicles 52 have not reached the station 54a. When the vehicles 52 receive new travel plans 80, the vehicles 52 discard the previous travel plans 80 and travel autonomously according to the new travel plans 80.

Figure 5:
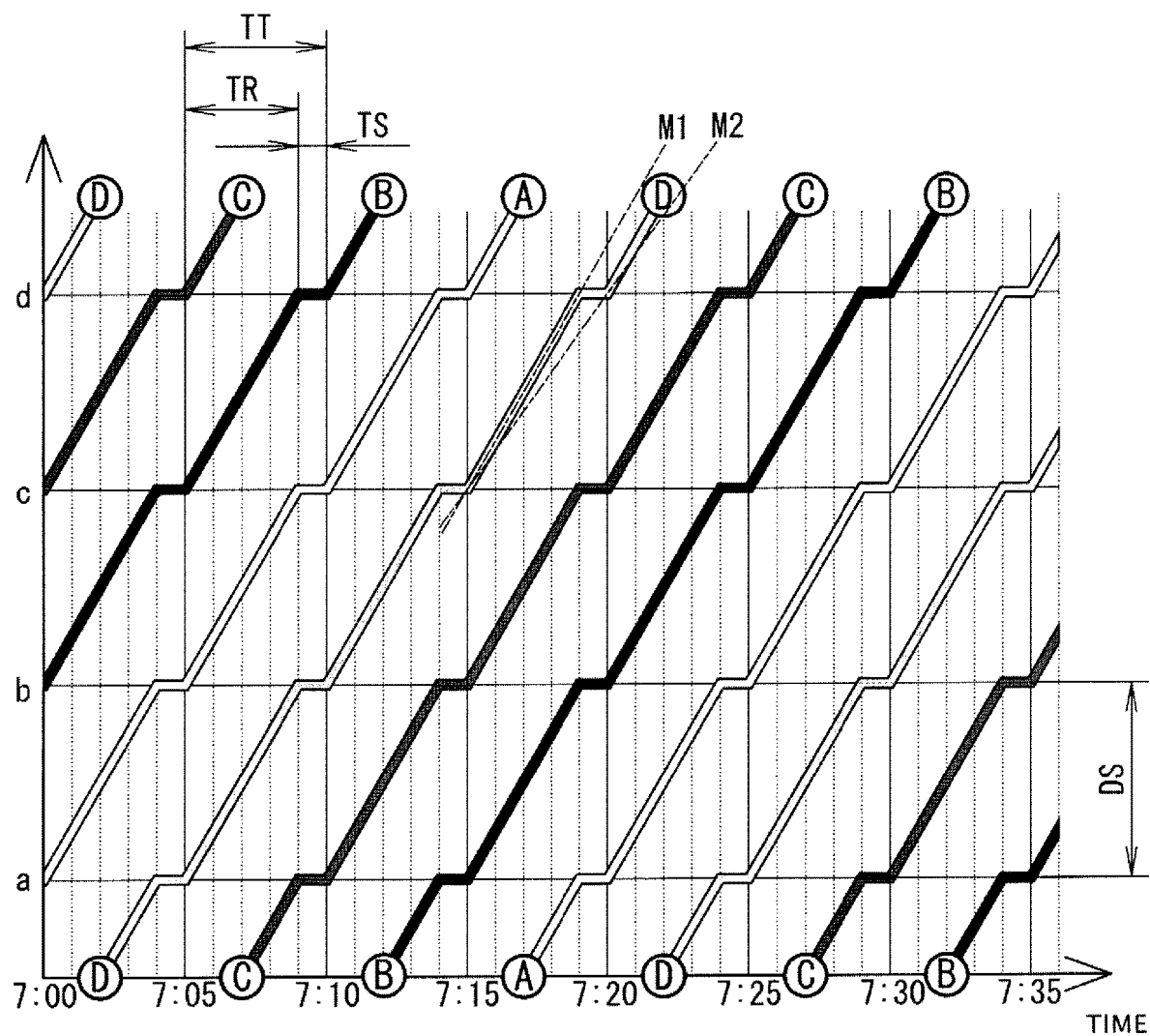
FIG. 5 is an operation timing chart of vehicles that travel autonomously according to the travel plans of FIG. 4.

The vehicles 52 travel autonomously according to the received travel plans 80. FIG. 5 is an operation timing chart of the vehicles 52A to 52D that travel autonomously according to the travel plans 80 of FIG. 4. In FIG. 5, the horizontal axis represents time, and the vertical axis represents the position of the vehicle 52. The manner in which the vehicles 52 travel will be described below after a brief description of what the parameters used in the following description represent.

In the following description, a distance from one station 54 to the next station 54 is referred to as "station-to-station distance DS". A time elapsed after a vehicle 52 departs from one station 54 until it departs from the next station 54 is referred to as "station-to-station required time TT", and a time for which a vehicle 52 stops at a station 54 for the purpose of picking up or discharging passengers is referred to as "stop time TS". A time elapsed after the departure from one station 54 until the arrival at the next station 54; that is, the station-to-station required time TT minus the stop time TS, is referred to as "station-to-station travel time TR". In FIG. 4, a number in a circle represents the station-to-station required time TT, and a number in a square represents a departure interval between vehicles 52 at a station 54.

A value calculated by dividing a travel distance by a travel time including the stop time TS is referred to as "scheduled speed VS", and a value calculated by dividing a travel distance by a travel time excluding the stop time TS is referred to as "average travel speed VA". The slope of a line M1 in FIG. 5 represents the average travel speed VA, and the slope of a line M2 in FIG. 5 represents the scheduled speed VS. The scheduled speed VS is inversely proportional to the station-to-station required time TT.

The operation of the vehicles 52 will next be described below with reference to FIG. 5. According to the travel plans 80 of FIG. 4, after the vehicle 52A departs from the station 54a at 7:00, the vehicle 52A is scheduled to depart from the station 54b five minutes later at 7:05. The vehicle 52A controls its average travel speed VA so that the travel from the station 54a to the station 54b and the pickup and drop-off of passengers are completed in five minutes.

Specifically, the vehicles 52 prestore a standard stop time TS that is necessary for picking up or discharging passengers, as a planned stop time TSp. The vehicles 52 calculate a target time of arrival at a station 54 by subtracting the planned stop time TSp from the departure time from the station 54 that is set by the travel plans 80. For example, when the planned stop time TSp is one minute, the target time of arrival at the station 54b for the vehicle 52A is 7:04. The vehicle 52 controls its travel speed so as to be able to arrive at the next station 54 by the target time of arrival that is calculated in this manner.

In some cases, one or more or all of the vehicles may be delayed from the travel plans 80 due to, for example, traffic congestion circumstances of the travel route 50 or an increased number of passengers. Also, some trouble may significantly lower the scheduled speed VS of one or more vehicles 52 to cause one or more of the vehicles 52 to be overtaken and passed by a vehicle 52 behind. When such delay or overtaking and passing of the vehicles 52 have occurred, one or more intervals between vehicles 52 are significantly changed, and the operation with intervals as originally planned; that is, the even-interval operation, fails. To address this situation, when a delay or overtaking and passing have occurred, the plan generator 14 modifies the travel plans 80 so as to be able to quickly and stably return to the operation with intervals as originally planned. For example, when a delay has occurred, the plan generator 14 attempts to return to the even-interval operation by temporarily increasing the speed of the delayed vehicle 52 or temporarily reducing the speed of another vehicle, which will not be described herein in detail. When overtaking and passing have occurred, the plan generator 14 modifies the travel plans 80 so as to be able to keep the order as switched upon the overtaking and passing. The modification made to the travel plans 80 upon overtaking and passing will be described in detail below.

Figure 6:
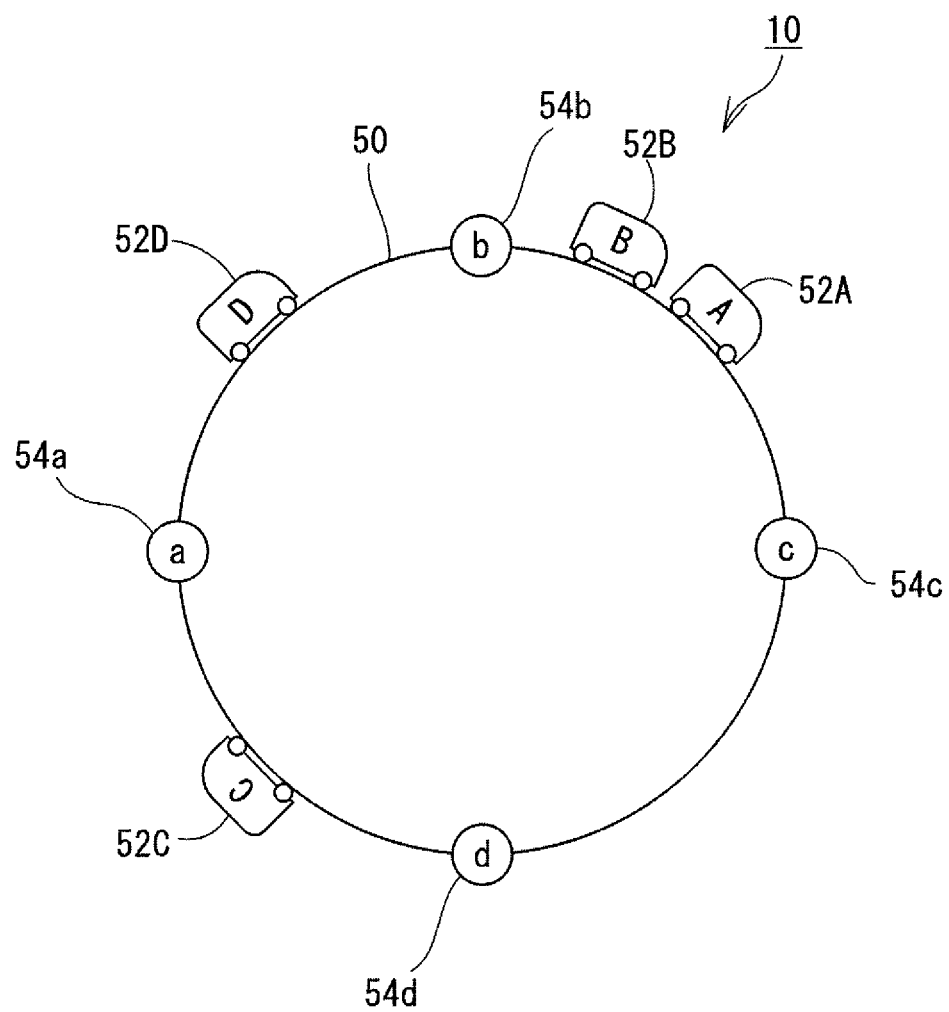
FIG. 6 is a conceptual diagram illustrating a state in which overtaking and passing have occurred.

FIG. 6 is a conceptual diagram illustrating a state in which overtaking and passing have occurred. In FIG. 6, as the scheduled speed VS of the vehicle 52B traveling between the station 54b and the station 54c is significantly lowered, the vehicle 52B is overtaken and passed by the vehicle 52A behind. As a result, the order of the vehicle 52A and the vehicle 52B in the line of vehicles is switched from the order that is set by the travel plans 80. Also, as the speed of the vehicle 52B is significantly lowered, the vehicle 52B is significantly delayed from the travel plans 80, and the interval between the vehicle 52B and the vehicle 52C ahead becomes significantly greater than the interval planned in the travel plans 80.

Under such circumstances, if the travel plans 80 are not modified, in order to eliminate the delay from the travel plans 80, the vehicle 52B has to significantly increase its speed to overtake and pass the vehicle 52A that has passed it. However, this results in frequent overtaking and passing and may impair stable traveling of the vehicles 52. Also, in some cases, due to traffic congestion circumstances of the travel route 50 or the number of passengers (which affects the passenger pickup and drop-off time at stations), it is, in the first place, difficult to significantly increase the scheduled speed VS. Also, even if the scheduled speed VS can be significantly increased, it takes a long time for the vehicle 52B that is so delayed that it is overtaken and passed by the vehicle 52A behind to eliminate the delay.

Figure 7:
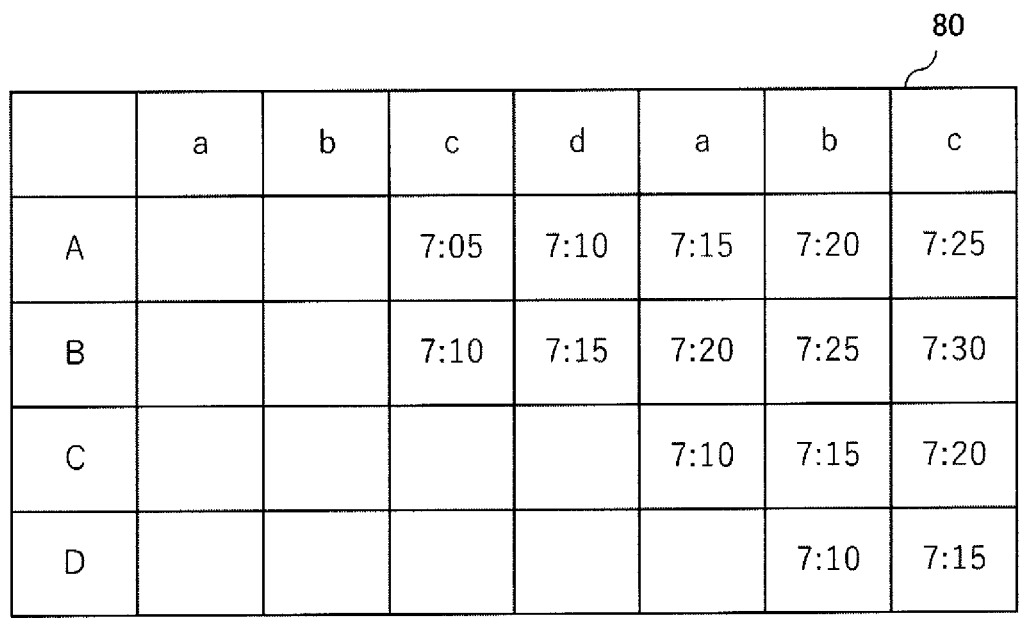
FIG. 7 provides an example of travel plans that are modified in response to overtaking and passing.
Figure 8:
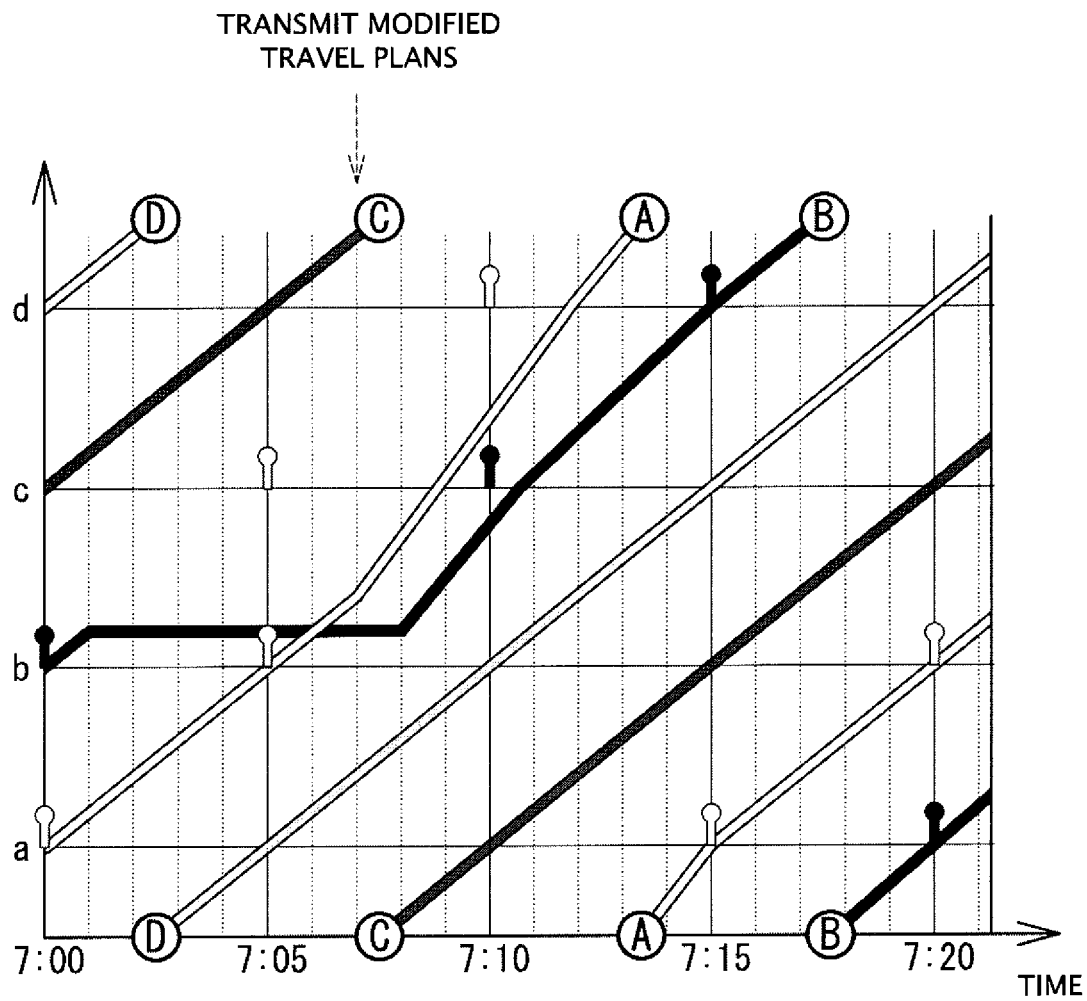
FIG. 8 illustrates an operation time schedule that is used for vehicles 52 when overtaking and passing have occurred.

To address this situation, in the illustrated embodiment, when overtaking and passing have occurred on the travel route 50, the travel plans 80 are modified so as to keep the order as switched upon the overtaking and passing. FIG. 7 provides an example of the travel plans 80 that are modified in response to overtaking and passing. FIG. 8 illustrates an operation time schedule that is used for the vehicles 52 when overtaking and passing have occurred. To facilitate recognition of the scheduled speed VS, FIG. 8 assumes that the stop time at each station 54 is zero. Hollow pushpin-like marks represent the departure times of the vehicle 52A that are set by the travel plan 80 and the modified travel plan 80, and solid pushpin-like marks represent the departure times of the vehicle 52B that are set by the travel plan 80 and the modified travel plan 80.

As illustrated in FIG. 8, it is assumed that the vehicle 52B departs from the station 54b as planned and then stops for seven minutes due to some trouble. As a result, at 7:06, the vehicle 52A behind that travels as planned overtakes and passes the vehicle 52B. The overtaking and passing are detected by the operation monitor 18. Upon detection of overtaking and passing, the plan generator 14 modifies the travel plans 80 so as to keep the order as switched upon the overtaking and passing.

Specifically, while the travel plans 80 indicate, before overtaking and passing occur, that the vehicles travel in the order of the vehicle 52D, the vehicle 52C, the vehicle 52B, and the vehicle 52A, the travel plans 80 are modified upon detection of overtaking and passing so that the vehicles travel in the order of the vehicle 52D, the vehicle 52C, the vehicle 52A, and the vehicle 52B.

The modification may be performed by one of various methods; the simplest method is that, in response to detection of overtaking and passing, the travel plan 80 of the vehicle 52 that has overtaken and passed another vehicle is switched with the travel plan 80 of the vehicle 52 that has been overtaken and passed, as illustrated in FIG. 7. Specifically, before detection of overtaking and passing, the travel plans 80 (that is, the travel plans 80 in FIG. 4) indicate that, at 7:10, the vehicle 52A departs from the station 54c, and the vehicle 52B departs from the station 54d. When overtaking and passing are detected, the travel plans 80 may be modified to switch the schedules of these two vehicles 52 so that, at 7:10, the vehicle 52A departs from the station 54d, and the vehicle 52B departs from the station 54c.

In the example illustrated in FIG. 8, the travel plans 80 of FIG. 7 are transmitted to the vehicle 52A and the vehicle 52B at 7:06 immediately after overtaking and passing have occurred. In this case, the vehicle 52A and the vehicle 52B adjust their scheduled speeds VS so as to satisfy the schedules that are set by the travel plans 80 as modified. As a result, deviations from the travel plans 80 are gradually eliminated, and, at 7:15, all vehicles 52 satisfy the schedules that are set by the travel plans 80.

Figure 9:
FIG. 9 provides another example of travel plans that are modified in response to overtaking and passing.

Although, in the above-described example, the travel plan 80 of the vehicle 52 that has overtaken and passed another vehicle is switched with the travel plan 80 of the vehicle 52 that has been overtaken and passed, the travel plans 80 may be modified in any other manner that keeps the order of the vehicles 52 as switched upon overtaking and passing. For example, travel plans 80 that set departure times as listed in FIG. 9 may be produced anew to avoid increasing the scheduled speeds VS of the vehicles 52A and 52B excessively after the occurrence of overtaking and passing.

In an embodiment, when a single vehicle 52, for example, the vehicle 52B, is overtaken and passed by other vehicles 52A, 52C, and 52D more than a predetermined acceptable number of times within a predetermined monitoring period (for example, within one week), that single vehicle 52B may be removed from the line of vehicles, and a new vehicle 52E may be added to the line of vehicles. Specifically, when the vehicle 52B is overtaken and passed by other vehicles 52A, 52C, and 52D a plurality of times within a certain period, there is a high possibility that the vehicle 52B has difficulty in traveling stably as some trouble has occurred. In such cases, the plan generator 14 generates travel plans 80 that indicate that the vehicle 52B should be removed from the line of vehicles, and the new vehicle 52E should be added to the line of vehicles.

The monitoring period and the acceptable number of times are not particularly limited but may be determined as appropriate according to the performance of the vehicles 52 or the specifications of the traffic system 10. When it is determined that the vehicle 52B should be removed from the line of vehicles, in order to transport riding passengers to respective destination stations 54, the vehicle 52B travels for one more complete journey along the travel route 50 with passengers being allowed to get off and being prohibited from boarding at the stations 54. When, due to trouble, the vehicle 52B is unable to travel even for one complete journey, another vehicle 52 travels to the vicinity of the vehicle 52B to pick up passengers riding in the vehicle 52B.

Figure 10:
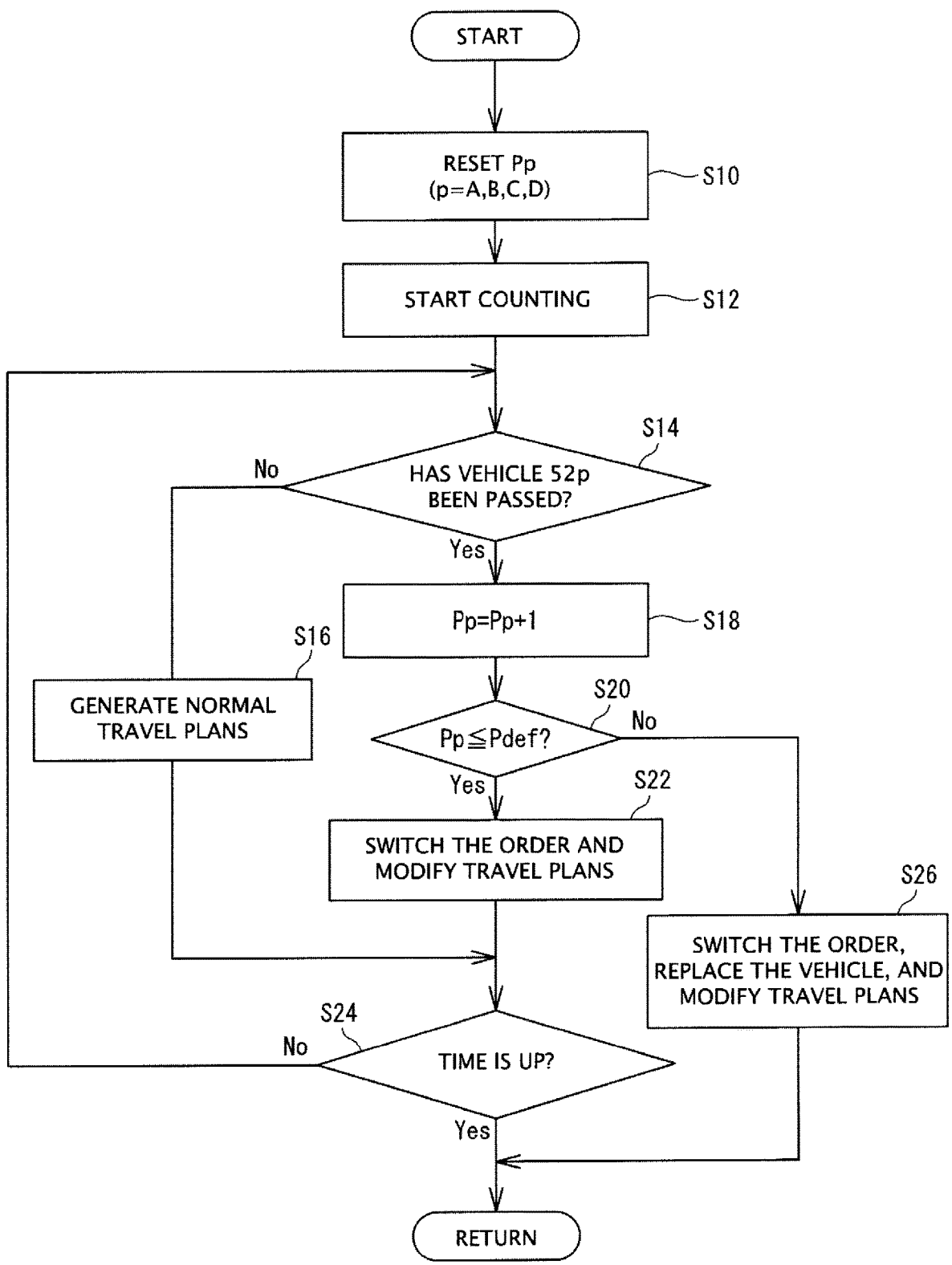
FIG. 10 is a flowchart illustrating the process of modifying travel plans in response to overtaking and passing.

The flow of process of modifying the travel plans 80 in response to overtaking and passing will next be described below with reference to FIG. 10. The plan generator 14 stores parameters Pp (p=A, B, C, or D) for managing the number of times which each vehicle 52 is overtaken and passed by another vehicle. The plan generator 14 also includes a counter for measuring the elapse of time.

The plan generator 14 first resets the parameters Pp (S10). Specifically, PA=0, PB=0, PC=0, and PD=0. The plan generator 14 also starts counting using the counter (S12).

Subsequently, the plan generator 14 determines whether or not overtaking and passing have occurred (S14). When it is determined that no vehicle 52 has been overtaken and passed (No in S14), the plan generator 14 generates normal travel plans 80 (S16), and then the process proceeds to step S24.

On the other hand, when one vehicle 52p has been overtaken and passed (Yes in S14), the plan generator 14 increments the parameter Pp for this vehicle 52p (S18). Subsequently, the parameter Pp is compared with a predetermined acceptable number of times Pdef (S20). When the comparison indicates that Pp≤Pdef, the plan generator 14 switches the order on the travel plans 80 between the vehicle 52 that has overtaken and passed another vehicle and the vehicle 52 that has been overtaken and passed, and modifies the travel plans 80 (S22). For example, the yet-to-be-modified travel plan 80 of the vehicle 52 that has overtaken and passed another vehicle is switched with the yet-to-be-modified travel plan 80 of the vehicle 52 that has been overtaken and passed. After the travel plans 80 are modified, the process proceeds to step S24.

In step S24, the plan generator 14 confirms the counter value and confirms whether or not the predetermined monitoring period has elapsed. When it is confirmed that the monitoring period has not elapsed (No in S24), the process returns to step S14 to repeat the processing of step S14 and subsequent steps. On the other hand, when the monitoring period has elapsed (Yes in S24), the process returns to step S10 to reset the parameter Pp, restart the counter, and repeat the processing of step S14 and subsequent steps.

When, in step S20, the parameter Pp exceeds the acceptable number of times, the plan generator 14 switches the order and generates travel plans 80 in which the vehicle 52 that has been overtaken and passed is replaced with a new vehicle 52 (S26). Subsequently, the process returns to step S10 to reset the parameter Pp, restart the counter, and repeat the processing of step S14 and subsequent steps.

As can be clearly understood from the foregoing description, according to the techniques disclosed in the present specification, when one vehicle 52 has been overtaken and passed by another vehicle, the order on the travel plans 80 is switched between the vehicle 52 that has overtaken and passed the other vehicle, and the vehicle 52 that has been overtaken and passed. As such, frequent overtaking and passing can be avoided, and the vehicles 52 can travel stably.

It should be noted that the above-described features are described by way of example; so long as the travel plans 80 are modified in response to overtaking and passing so as to keep the order as switched upon the overtaking and passing, the remaining features may be changed as appropriate. For example, the numbers and the intervals of the stations 54 and the vehicles 52 may be changed as appropriate. While the above-described travel plans 80 set only the departure times at the stations 54, the travel plans 80 may take another form. For example, either instead of or in addition to the departure times at the stations 54, the travel plans 80 may also set, for example, the arrival times at the stations 54 or the average travel speeds VA of the vehicles 52.

The invention claimed is:

1. An operation management apparatus, comprising:
a processor configured to
generate a travel plan for each of a plurality of vehicles that form a line of vehicles and that travel autonomously along a predetermined travel route;
transmit the travel plans to the respective vehicles and receive, from the vehicles, travel information that indicates travel status of the vehicles; and
detect, based on the travel information, whether one of the vehicles has passed another of the vehicles, wherein
the processor, in response to the one of the vehicles passing the other of the vehicles, modifies the travel plans to keep the plurality of vehicles in an order resulting from the passing,
the travel plans cause the plurality of vehicles to autonomously depart from destinations according to a schedule, and
when a single vehicle has been passed more than a predetermined number of times within a predetermined monitoring period, the processor modifies the travel plans to remove the single vehicle from the line of vehicles and add a new vehicle to the line of vehicles.

2. The operation management apparatus according to claim 1, wherein, in response to the one of the vehicles passing the other of the vehicles, the processor modifies the travel plans so that the travel plan of the one of the vehicles is switched with the other of the vehicles.

3. An operation management method, comprising:
generating a travel plan for each of a plurality of vehicles that form a line of vehicles and that travel autonomously along a predetermined travel route;
transmitting the travel plans to the respective vehicles, wherein the travel plans cause the plurality of vehicles to autonomously depart from destinations according to a schedule;
receiving, from the vehicles, travel information that indicates travel status of the vehicles; and
detecting, based on the travel information, whether one of the vehicles has passed another of the vehicles,
wherein, in response to the one of the vehicles passing the other of the vehicles, the travel plans are modified to keep the plurality of vehicles in an order resulting from the passing, and
when a single vehicle has been passed more than a predetermined number of times within a predetermined monitoring period, the travel plans are modified to remove the single vehicle from the line of vehicles and add a new vehicle to the line of vehicles.

4. A traffic system, comprising:
a plurality of vehicles that travel autonomously along a predetermined travel route and form a line of vehicles; and
an operation management apparatus configured to manage operations of the plurality of vehicles,
wherein the operation management apparatus comprises a processor configured to:
generate a travel plan for each of the plurality of vehicles;
transmit the travel plans to the respective vehicles and receive, from the vehicles, travel information that indicates travel status of the vehicles; and
detect, based on the travel information, whether one of the vehicles has passed another of the vehicles, wherein the processor, in response to the one of the vehicles passing the other of the vehicles, modifies the travel plans to keep the plurality of vehicles in an order resulting from the passing, the travel plans cause the plurality of vehicles to autonomously depart from destinations according to a schedule, and when a single vehicle has been passed more than a predetermined number of times within a predetermined monitoring period, the processor modifies the travel plans to remove the single vehicle from the line of vehicles and add a new vehicle to the line of vehicles.

\* \* \* \* \*